United States Patent [19]

Timm

[11] Patent Number: 4,758,026
[45] Date of Patent: Jul. 19, 1988

[54] ROTARY JOINT WITH BALANCED SEALS

[75] Inventor: Gerald L. Timm, Schoolcraft, Mich.

[73] Assignee: The Johnson Corporation, Three Rivers, Mich.

[21] Appl. No.: 17,780

[22] Filed: Feb. 17, 1987

[51] Int. Cl.$^4$ .............................................. F16L 39/04
[52] U.S. Cl. ................................... 285/134; 285/279; 285/281; 285/900
[58] Field of Search ............... 285/134, 900, 279, 281, 285/190

[56] References Cited

U.S. PATENT DOCUMENTS

| | | |
|---|---|---|
| 2,352,317 | 6/1944 | Goff et al. |
| 2,385,421 | 9/1945 | Monroe |
| 2,700,558 | 1/1955 | Hieronymus |
| 2,911,234 | 11/1959 | Hieronymus |
| 3,594,019 | 7/1971 | Gotschall ............................ 285/14 |
| 3,874,707 | 4/1975 | Calkins ................................ 285/93 |
| 4,051,604 | 10/1977 | Fleissner ......................... 285/134 X |
| 4,194,767 | 3/1980 | McCracken ...................... 285/134 |
| 4,262,940 | 4/1981 | Wiedenbeck et al. ............. 285/61 |
| 4,477,107 | 10/1984 | Ferguson et al. ................. 285/134 |
| 4,635,949 | 1/1987 | Jackson ........................ 285/134 X |

FOREIGN PATENT DOCUMENTS 935103  6/1948  France .............................. 285/134

Primary Examiner—Dave W. Arola
Attorney, Agent, or Firm—Beaman & Beaman

[57] ABSTRACT

A rotary joint for establishing communication of a pressurized medium with a rotating heat exchanger drum wherein the joint seals and associated structure are of such configuration to permit internal balancing with respect to fluid pressures imposed thereon. A rotating nipple within the joint body utilizes spherical seal surfaces engaging annular seal rings to achieve self alignment and the nipple includes spring biased collars which automatically compensate for wear and retaining structure limits collar displacement to prevent joint damage.

5 Claims, 1 Drawing Sheet

ROTARY JOINT WITH BALANCED SEALS

BACKGROUND OF THE INVENTION

Rotating heat exchanger drums such as used in the manufacture of paper and fabric utilize rotary joints for establishing communication between the drum and a heating or cooling medium such as steam or cold water. Such rotary joints usually include an elongated pipe or nipple which is concentrically affixed to an end of the heat exchanger drum, and an end of the nipple is located within a chamber defined by the joint housing or body. The pressurized medium communicates with the stationary body and passes through the nipple into the drum. Seal structure within the joint body prevents loss of fluid between the relatively rotating nipple and body. Typical examples of rotary joints for drums are shown in U.S. Pat. Nos. 2,352,317; 2,385,421; 2,700,558; 2,911,234; 3,594,019; 3,874,707 and 4,262,940.

Pressurized fluid mediums, such as steam, impose forces upon the joint seals which accelerate seal wear, and various constructions have been proposed to compensate for such internal pressures on the seals, and typical examples of pressure compensated rotary joints owned by the assignee are shown in U.S. Pat. Nos. 2,700,558; 3,874,707 and 4,262,940. Rotary joints wherein seal pressures are compensated by externally mounted apparatus, such as in U.S. Pat. Nos. 2,700,558 and 3,874,707 are expensive and bulky, and it is an object of the invention to provide a rotary joint for heat exchanger drums wherein the seals thereof may be internally compensated with respect to fluid pressures and the need for externally located compensating apparatus is eliminated. In the assignee's application No. 739,862 filed May 31, 1985 a double seal internally pressure compensated rotary joint is disclosed, but this rotary joint requires very precise installation and is not self aligning.

Another object of the invention is to provide a rotary joint for heat exchanger drums wherein the seals of the joint are internally compensated with respect to internal pressurized medium forces, the joint may be rigidly mounted, and wherein limited misalignment between the nipple and joint body may be accommodated and the alignment of the joint is automatically achieved.

Yet another object of the invention is to provide a rotary joint for heat exchanger drums wherein the joint seals are internally compensated with respect to fluid pressures, the joint structure may be readily assembled and serviced, and wherein the components may be manufactured by conventional rotary joint machining techniques.

In the practice of the invention a tubular nipple includes an outer end affixed to the end of a heat exchanger drum for rotation therewith, and the nipple inner end is located within a chamber defined within a rotary joint body. The body chamber is partially enclosed by annular wear and assembly plates attached to the body having central openings and inner flat seal surfaces lying in planes perpendicular to the length of the nipple, and annular carbon graphite seal rings engage the plates' seal surfaces. The nipple inner end includes an enlarged cylindrical portion having a collar in the form of a nipple body axially displaced thereon and the nipple body includes a spherical segment seal surface defined thereon engaging a complementary spherical surface on an adjacent seal ring. The nipple body is sealingly axially displaceable upon the nipple inner end enlarged portion and its axial movement is limited by transverse pins mounted on the nipple extending within axially defined slots formed in the nipple body.

A thrust collar having a spherical segment sealing surface is also mounted upon the nipple inner end enlarged portion within the body chamber in sealing engagement with a carbon graphite seal ring associated with the assembly plate and a compression spring is interposed between the nipple body and thrust collar biasing these components away from each other in the axial direction of the nipple. Key pins mounted on the nipple rotate the thrust collar with the nipple.

The geometric relationship and dimensions of the engaging sealing surfaces of the nipple body and associated seal ring, and the thrust collar and associated seal ring, and the faces of these components exposed to the pressure within the chambers are such that the forces imposed upon the nipple body and thrust collar and seal rings within the body chamber are generally balanced preventing excessive axial forces existing between the relatively moving sealing surfaces. In this manner internal seal balancing is achieved.

Ports are defined within the nipple for establishing communication between the interior of the nipple and the joint chamber, and a port within the body communicating with the chamber permits supply of pressurized medium to the nipple. Additionally, a syphon pipe may extend through the nipple and a gland threaded into the thrust collar seals the syphon pipe with respect to the thrust collar permitting communication of the syphon pipe with a head affixed to the assembly plate for permitting steam condensate to be removed from the associated dryer drum.

The desired geometrical relationship between the collars and seal rings can be achieved because of the enlarged cylindrical portion defined on the nipple inner end upon which the collars are mounted. The spherical surface of the nipple body extends over a nipple end transition shoulder and the spherical surface on the thrust collar extends over the nipple terminal end. These relationships permit the outer radial dimension of the collars' spherical surfaces to be greater than the outer diameter of the seal rings and the inner radial dimension of the spherical surfaces of the collars are less than the diameter of the nipple inner end enlarged portion, yet sufficient seal areas of contact between the collars and seal rings is achieved to prevent excessive seal area pressures. The result of these structural and geometrical relationships permits substantial balancing and compensation of the fluid pressures imposed on the collars and seal rings, and in a joint constructed in accord with the inventive concepts seal wear is substantially extended as compared with noncompensated joints. The joint components may be readily assembled within the body cavity and the spherical configuration of seal surfaces of the nipple body and thrust collar permit accommodation of limited misalignment between the body support and the axis of drum rotation while mounting the joint body on a relatively rigid support bracket.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
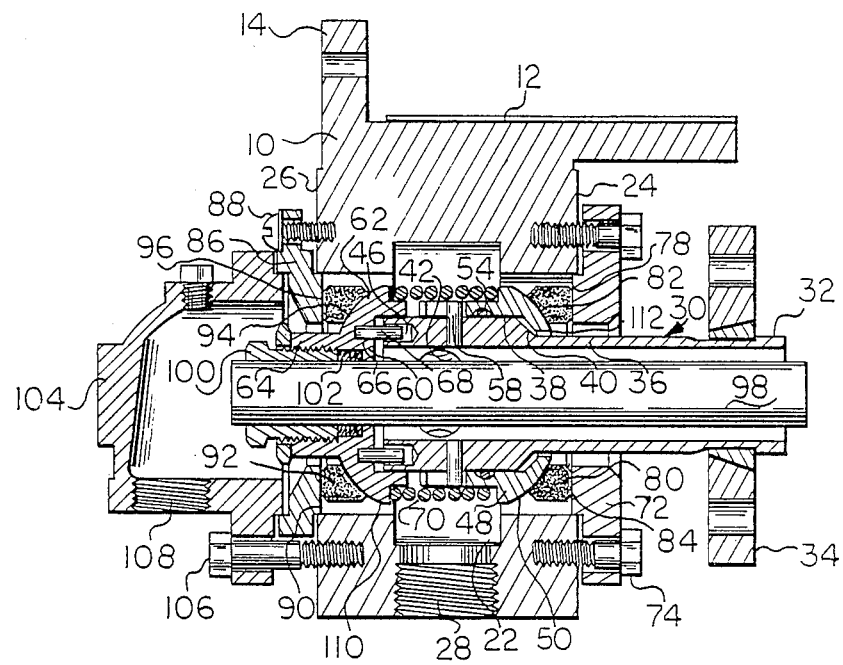
FIG. 1 is an elevational, diametrical, sectional view of a rotary joint in accord with the invention.
Figure 2:
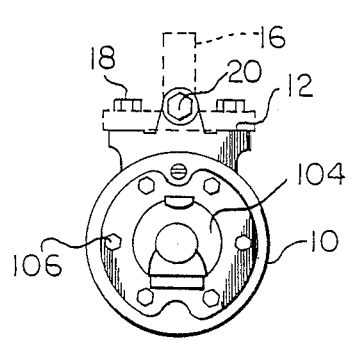
FIG. 2 is a reduced scale end elevational view of the joint of FIG. 1 as taken from the left thereof.
Figure 3:
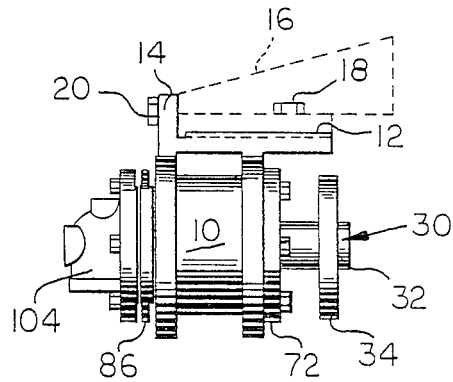
FIG. 3 is a side elevational view of the joint as taken from the right of FIG. 2.

A rotary joint in accord with the invention includes a cast iron body 10 having mounting surfaces 12 defined thereon and includes a mounting boss 14. The mounting surfaces and the boss permit the joint body to be mounted upon a fixed support bracket 16 which is shown in dotted lines and which is attached to support structure for a rotating heat exchanger drum, not shown. The support bracket 16 includes flanges through which bolts 18 extend and which thread into holes defined in the mounting surfaces 12, and bolt 20 extends through the mounting boss 14, and into the bracket 16. In this manner the joint body 10 may be substantially rigidly affixed adjacent to the heat exchanger drum wherein the axis of the body chamber is substantially coaxial with the drum axis of rotation.

The body 10 includes generally cylindrical chamber 22 which intersects the body flat sides 24 and 26, and the axis of the chamber 22 is substantially coaxial with the axis of heat exchanger drum rotation. A threaded inlet port 28 is defined in the body communicating with the chamber.

A tubular nipple 30 includes an outer end 32 upon which a known mounting flange 34 is located for cooperation with the nipple groove by means of wedge collar and the mounting flange is used to attach the nipple to a drum as shown in assignee's U.S. Pat. No. 2,911,234.

Figure 4:
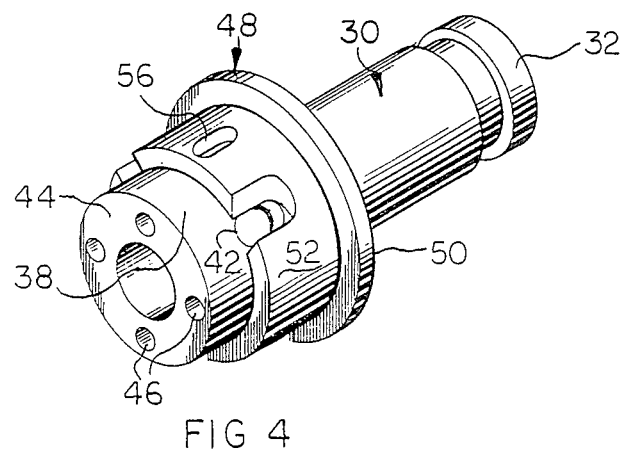
FIG. 4 is a perspective view of the nipple and nipple body, per se.

The inner end 36 of the nipple 30 extends into the body chamber 22 and includes an enlarged cylindrical portion 38 having an exterior cylindrical surface defining a transitional shoulder 40 with the smaller diameter portion of the nipple, and the nipple inner end includes several transverse ports 42 which establish communication between the interior of the nipple and the body chamber 22. Additionally, the nipple terminal end 44 includes four axially extending blind holes 46 as will be appreciated from FIGS. 1 and 4.

An annular collar or nipple body 48 is mounted upon the nipple portion 38 for axial displacement thereon, and the nipple body includes a spherical segment seal surface 50, a hub portion 52 and an internal groove in which O-ring 54 is located for sealing the nipple body to the nipple portion 38. Additionally, four slots 56 are defined in the nipple body hub 52 and each slot receives a transversely extending spring pin 58 pressed within a hole in the nipple and received within an associated slot wherein axial movement of the nipple body 48 on the nipple is limited by engagement of the pins with the ends of the slots 56.

A thrust collar 60 is also located upon the nipple portion 38 adjacent its end 44, and the thrust collar includes a spherical segment sealing surface 62 and an internally threaded cylindrical extension 64. A plurality of blind holes 66 are located within the thrust collar for receiving axially extending pins 68 which are received within the four nipple holes 46 and serve as keys for assuring rotation of the thrust collar 60 with the nipple.

A compression spring 70 is interposed between radial shoulders defined upon the nipple body 48 and the thrust collar 60 biasing these components in an axial direction away from each other for a purpose later described.

An annular cast iron wear plate 72 is attached to the joint body side 24 by bolts 74 and includes a central opening 76 through which the nipple 30 extends, and an inner flat sealing surface 78 lying in a plane perpendicular to the length of the nipple. An annular seal ring 80 of carbon graphite is interposed between the nipple body surface 50 and the wear plate seal surface 78, and the seal ring includes a concave spherical segment sealing surface 82 for engaging the nipple body surface 50, and a flat sealing surface 84 engaging the wear plate surface 78.

An annular assembly plate 86 is attached to the body side 26 by screws 88 and the assembly plate includes an annular central opening through which the thrust collar extension 64 extends. The assembly plate 86 includes a flat seal surface 90 perpendicular to the axis of the nipple, and an annular seal ring 92 of carbon graphite is interposed between the assembly plate 86 and the thrust collar 60 having a concave spherical surface 94 complementary to and engaged by the thrust collar spherical surface 62, and having a flat seal surface 96 engaging the assembly plate surface 90.

In the embodiment shown in FIG. 1 a syphon pipe 98 associated with drum syphon structure is illustrated, and the syphon pipe extends through the nipple 30 and through a gland 100 threaded into the end of the thrust collar extension 64 for compressing packing 102 to establish a sealed relationship between the thrust collar 60 and the syphon pipe. A head 104 is attached to the joint body 10 to establish communication with the end of the syphon pipe 98 and the head engages complementary interfitting surfaces defined on the assembly plate 86 and is affixed to the joint body by bolts 106. The head 104 includes an outlet port 108 to which a syphon conduit discharge system may be attached, and condensate flowing through the syphon pipe 98 is removed through the head 104.

The compression spring 70 will initially maintain engagement between the spherical surfaces of the nipple body 48 and the seal ring 80 and the thrust collar 60 and the seal ring 92, and also initially maintain engagement between the flat surfaces of the seal ring 80 and the wear plate 72, and the seal ring 92 and the assembly plate 86.

The nipple body 48 and the thrust collar 60 include a plurality of surfaces or faces which are subjected to the fluid pressure within the chamber 22. For instance, the radial shoulders which engage the ends of the spring 70 and the inner ends of the nipple body and thrust collar adjacent nipple portion 38 form pressure faces which produce axial forces tending to separate the nipple body and thrust collar. Conversely, as the outer diameter dimension of the spherical surfaces 48 and 62 as represented at 110 is greater than the outer diameter of the associated seal rings 80 and 92, respectively, and are spaced from the seal rings these spherical surfaces will be exposed to the chamber fluid pressure and exert axial forces on the nipple body 48 and thrust collar 60 tending to force these components toward each other.

As the spherical surface 50 of the nipple body extends inwardly over the transition shoulder 40, and as the thrust collar spherical surface 62 extends inwardly over the nipple end 44 the inner diametrical dimension of these spherical surfaces as represented at 112 is less than the diameter of the nipple portion 38.

The aforedescribed geometrical relationships permit the engaged portions of surfaces 50 and 82, 78 and 84, 62 and 94, and 90 and 96 to be located radially inwardly with respect to the pressure faces defined on the nipple body and thrust collar to a greater degree than known rotary joints using collars having spherical surfaces permitting an effective balancing of sealing forces to be achieved.

The reception of the spring pins 58 within the nipple body slots 56 will permit the necessary axial displacement of the nipple body on the nipple to compensate for wear of the seal rings 80 and 92, but engagement of the spring pins with the ends of the slots will limit the nipple body axial movement to prevent the nipple body from engaging and damaging the wear plate 72 as the seal ring 80 wears and "thins". Upon extensive leaking occurring due to wear of the seal rings new seal rings 80 and 92 may be readily installed by removing the wear plate 72 and assembly plate 86, respectively.

The spherical configuration of the surfaces 50 and 62 permits effective sealing to take place between the nipple 30 and the joint body 10 even though the body 10 is rigidly mounted by bracket 16 and though misalignment may be present with respect to the axis of the chamber 22 and the axis of rotation of the nipple. Thus, it will be appreciated that the aforedescribed rotary joint configuration permits internal balancing of fluid pressures to provide maximum seal wear, and also accommodates limited misalignment of axes of rotation.

It is appreciated that various modifications to the disclosed embodiment may be apparent to those skilled in the art without departing from the scope of the invention. For instance, the inventive concepts may be practiced in a rotary joint not utilizing a syphon pipe 98 and head 104 and in such instance the assembly plate extension 64 will be plugged.

I claim:

1. A rotary joint for rotating heat exchanger drums characterized by its internally pressure-balanced seals and self alignment comprising, in combination, an elongated tubular nipple having an axis, an outer end adapted to be coaxially attached to a drum shaft for rotation therewith about the axis of drum rotation, and an inner end, a body, a chamber defined in said body having first and second sides having flat inner surfaces, a bracket mounting surface defined on said body for substantially rigidly mounting said body relative to a drum, a port defined in said body in communication with said chamber, an opening defined in said body first side, said nipple extending through said opening wherein said inner end is located within said chamber, said nipple inner end including a first concentric cylindrical surface of enlarged diameter, first and second collars mounted upon said nipple inner end first surface for rotation with said nipple, means mounting at least one of said collars on said enlarged first surface for axial displacement thereon, a spherical surface defined upon each of said collars having a center located upon said nipple axis and having maximum and minimum radial dimensions with respect to said nipple axis, said spherical surfaces of said first and second collars being disposed toward said body first and second sides, respectively, first and second annular seal rings interposed between and sealingly engaging said first body side inner surface and said first collar spherical surface and said second body side inner surface and said second collar spherical surface, respectively, said seal rings each being substantially concentric to said nipple axis and each having inner and outer diameters, a flat radial seal surface engaging the adjacent body inner surface and a spherical seal surface complementary to and engaging the spherical surface of the adjacent collar, said seal rings' inner diameter and said collars' spherical surfaces inner dimension diameter being less than the diameter of said nipple inner end enlarged portion and the diameter of said seal rings' outer diameter being less than the diameter of said collars' spherical surfaces' outer dimension, first pressure faces defined on said collars and seal rings biasing said collars and seal rings toward the associated body side when exposed to the fluid pressure within said chamber, second pressure faces defined on said collars and seal rings biasing said collars and seal rings away from the associated body side when exposed to the fluid pressure within said chamber, the areas of said first pressure faces being only slightly greater than the areas of said second pressure faces whereby the axial forces imposed upon said seal rings by the chamber fluid pressure is substantially balanced, and passage means establishing communication between said chamber and said nipple.

2. In a rotary joint as in claim 1 said first collar comprising a nipple body axially displaceable on said nipple inner end enlarged surface, restraining means interposed between said nipple body and said nipple inner end limiting nipple body axial movement thereon, said second collar comprising a thrust collar, and key means keying said thrust collar to said nipple inner end for rotation therewith.

3. In a rotary joint as in claim 2 said nipple inner end enlarged portion having a terminal end within said body chamber, said second collar extending over said terminal end whereby said second collar spherical surface outer dimension is of greater diameter than said nipple end enlarged portion and said inner dimension is of lesser diameter than said enlarged portion.

4. In a rotary joint as in claim 3 a radially extending transition shoulder defined upon said nipple inner end between said enlarged portion and said first side, said first collar including a portion extending over said transition shoulder on which said first collar spherical surface is defined whereby said first collar spherical surface outer dimension is of a greater diameter than that of said enlarged portion and said inner dimension is of a lesser diameter than said enlarged portion.

5. In a rotary joint as in claim 3 said key means comprising a plurality of axially extending first holes defined in said nipple terminal end, a plurality of axially extending second holes defined in said second collar each in alignment with a first hole, and a pin received within each aligned first and second holes, said pins keying said second collar to said nipple inner end for rotation therewith.

* * * * *